(12) United States Patent
Daicho et al.

(10) Patent No.: US 7,704,411 B2
(45) Date of Patent: Apr. 27, 2010

(54) PHOSPHOR

(75) Inventors: Hisayoshi Daicho, Shizuoka (JP);
Takeshi Iwasaki, Shizuoka (JP);
Kiminori Enomoto, Shizuoka (JP); Yu Shinomiya, Shizuoka (JP); Shinobu Aoyagi, Aichi (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 12/098,153

(22) Filed: Apr. 4, 2008

(65) Prior Publication Data
US 2008/0253951 A1 Oct. 16, 2008

(30) Foreign Application Priority Data

Apr. 5, 2007 (JP) ............................. 2007-099019
Mar. 26, 2008 (JP) ............................. 2008-080192

(51) Int. Cl.
*C09K 11/08* (2006.01)
*C09K 11/54* (2006.01)
*H01J 1/62* (2006.01)
*H01J 63/04* (2006.01)
*C01F 17/00* (2006.01)

(52) U.S. Cl. ............... 252/301.4 R; 313/483; 313/503; 423/263; 252/301.6 R

(58) Field of Classification Search ............... 423/263; 313/483, 503; *C01F 17/00*
See application file for complete search history.

(56) References Cited

U.S. PATENT DOCUMENTS

| | | | | |
|---|---|---|---|---|
| 5,746,943 | A * | 5/1998 | Torardi | 252/301.4 P |
| 5,786,600 | A * | 7/1998 | Lambert et al. | 250/484.4 |
| 2006/0088499 | A1* | 4/2006 | Percec | 424/78.27 |
| 2006/0186377 | A1* | 8/2006 | Takahashi et al. | 252/301.4 F |
| 2006/0214175 | A1* | 9/2006 | Tian | 257/98 |
| 2007/0145879 | A1* | 6/2007 | Abramov et al. | 313/483 |
| 2008/0031797 | A1* | 2/2008 | Xia et al. | 423/263 |

FOREIGN PATENT DOCUMENTS

| | | |
|---|---|---|
| JP | 2003-110150 A | 4/2003 |
| JP | 3503139 B2 | 12/2003 |
| JP | 2005-126577 A | 5/2005 |

* cited by examiner

*Primary Examiner*—Melvin C Mayes
*Assistant Examiner*—Joseph V Micali
(74) *Attorney, Agent, or Firm*—Sughrue Mion, PLLC

(57) ABSTRACT

A phosphor is provided. The phosphor includes a composition represented by the formula: $M^1O_2 \cdot aM^2O \cdot bM^3X_2:M^4$, where $M^1$ is at least one element selected from the group consisting of Si, Ge, Ti, Zr, and Sn; $M^2$ is at least one element selected from the group consisting of Mg, Ca, Sr, Ba, and Zn; $M^3$ is at least one element selected from the group consisting of Mg, Ca, Sr, Ba, and Zn; X is at least one halogen element; $M^4$ is at least one element essentially including $Eu^{2+}$ selected from the group consisting of rare-earth elements and Mn; a is in the range of $0.1 \leq a \leq 1.3$; and b is in the range of $0.1 \leq b \leq 0.25$.

22 Claims, 8 Drawing Sheets

PHOSPHOR

BACKGROUND OF THE INVENTION

1. Technical Field

Compositions consistent with the present invention relate to phosphors and, more particularly, to phosphors that are efficiently excited by ultraviolet light or short-wavelength visible light to emit light.

2. Description of the Related Art

Various light emitting devices have been known that can provide light of desired colors by combining a light emitting element and a phosphor which is excited by light generated by the light emitting element and then emits light of a wavelength band different from that of the light emitting element.

Particularly, a related art light emitting device that provides white light by combining a semiconductor light emitting element, which emits ultraviolet light or short-wavelength visible light, such as a light emitting diode (LED) and a laser diode (LD), with a phosphor that uses them as an excitation light source has been proposed as a white light emitting device that is durable and consumes little power.

Various such related art white light emitting devices have been proposed, such as (1) a device combining an LED that emits blue light and a phosphor that is excited by the blue light and then emits yellow light, and (2) a device combining a plurality of LEDS that emit violet light or ultraviolet light and phosphors that emit light with colors of red, green, blue, yellow, and the like. (see e.g., Japanese Patent No. 3503139; Japanese Unexamined Patent Application Publication No. 2005-126577; and Japanese Unexamined Patent Application Publication No. 2003-110150)

However, the related art white light emitting devices described above have a few disadvantages. For example, in the related art white light emitting device (1), there is little light of a wavelength band between the blue color and the yellow color, and a color rendering property is small because there is little light of a red region obtained from the phosphor. The white light is obtained by mixing the light of the LED and the light of the phosphor. Accordingly, for example, when the application amount of the phosphor is not uniform in a production process of the related art white light emitting device, balance in the amount of light emitted by the LED and the phosphor is broken. Therefore, non-uniformity occurs also in the spectrum of the obtained white light.

The related art white light emitting device (2) is good in a color rendering property, but a phosphor having a strong excitation band in an ultraviolet light region or a short-wavelength visible light region has not been found, and thus it has been difficult to realize a high-power white light emitting device.

SUMMARY OF THE INVENTION

Exemplary embodiments of the present invention address the above disadvantages and other disadvantages not described above. However, the present invention is not required to overcome the disadvantages described above, and thus, an exemplary embodiment of the present invention may not overcome any of the problems described above.

Accordingly, it is an aspect of the present invention to provide a phosphor capable of efficiently emitting visible light with a strong excitation band in an ultraviolet light region or a short-wavelength visible light region.

It is another aspect of the present invention to provide a phosphor that is efficiently excited in a wavelength band near 400 nm to emit visible light with high light emitting intensity.

It is also an aspect of the present invention to realize a light emitting device with a high color rendering property and having a broad light emitting spectrum.

According to one or more aspects of the present invention, a phosphor includes a composition represented by the formula:

$$M^1O_2 \cdot aM^2O \cdot bM^3X_2 : M^4$$

wherein $M^1$ is at least one element selected from the group consisting of Si, Ge, Ti, Zr, and Sn; $M^2$ is at least one element selected from the group consisting of Mg, Ca, Sr, Ba, and Zn; $M^3$ is at least one element selected from the group consisting of Mg, Ca, Sr, Ba, and Zn; X is at least one halogen element; $M^4$ is at least one element essentially including $Eu^{2+}$ selected from the group consisting of rare-earth elements and Mn; a is in the range of $0.1 \leq a \leq 1.3$; and b is in the range of $0.1 \leq b \leq 0.25$.

According to one or more aspects of the present invention, when the content of $M^4$ in the formula is c mole ratio, c is in the range of $0.03 < c/(a+c) < 0.8$.

According to one or more aspects of the present invention, $M^1$ in the formula essentially includes at least Si, and a ratio of Si is 80 mol % or more.

According to one or more aspects of the present invention, $M^2$ in the formula essentially includes at least one of Ca and Sr, and a ratio of said at least one of Ca and Sr is 60 mol % or more.

According to one or more aspects of the present invention, $M^3$ in the formula essentially includes at least Sr, and a ratio of Sr is 30 mol % or more.

According to one or more aspects of the present invention, X in the formula essentially includes at least Cl, and a ratio of Cl is 50 mol % or more.

According to one or more aspects of the present invention, in the formula, a is in the range of $0.30 \leq a \leq 1.2$, b is in the range of $0.1 \leq b \leq 0.20$, and the content c of $M^4$ is in the range of $0.05 \leq c/(a+c) \leq 0.5$.

According to one or more aspects of the present invention, a phosphor is obtained by mixing and baking starting materials, wherein the starting materials include at least compounds represented by the formulas (1) to (4):

$$M^1O_2 \qquad (1)$$

$$M^2O \qquad (2)$$

$$M^3X_2 \qquad (3)$$

$$M^4 \qquad (4)$$

wherein mole ratios of the compounds are in the range of (1):(2)=1:0.1 to 1.0; (2):(3)=1:0.2 to 12.0; and (2):(4)=1:0.05 to 4.0, respectively, wherein $M^1$ is at least one element selected from the group consisting of Si, Ge, Ti, Zr, and Sn; $M^2$ is at least one element selected from the group consisting of Mg, Ca, Sr, Ba, and Zn; $M^3$ is at least one element selected from the group consisting of Mg, Ca, Sr, Ba, and Zn; X is at least one halogen element; and $M^4$ is at least one element essentially including $Eu^{2+}$ selected from the group consisting of rare-earth elements and Mn.

According to one or more aspects of the present invention, $M^1$ in the formula (1) essentially includes at least Si, and a ratio of Si is 80 mol % or more.

According to one or more aspects of the present invention, $M^2$ in the formula (2) essentially includes at least one of Ca and Sr, and a ratio of said at least one of Ca and Sr is 60 mol % or more.

According to one or more aspects of the present invention, $M^3$ in the formula (3) essentially includes at least Sr, and a ratio of Sr is 30 mol % or more.

According to one or more aspects of the present invention, X in the formula essentially includes at least Cl, and a ratio of Cl is 50 mol % or more.

According to one or more aspects of the present invention, mole ratios of the compounds are in the range of (1):(2)=1:0.25 to 1.0; (2):(3)=1:0.3 to 6.0; and (2):(4)=1:0.05 to 3.0, respectively.

According to one or more aspects of the present invention, mole ratios of the compounds are in the range of (1):(2)=1:0.25 to 1.0; (2):(3)=1:0.3 to 4.0; and (2):(4)=1:0.05 to 3.0, respectively.

In the starting materials, it is advantageous that the raw material in the composition formula (3) is provided in an amount that exceeds the stoichiometric ratio. The amount in excess of the stoichiometric ratio is added because a part of halogen element is evaporated in the course of baking the raw mixture, and thus it is possible to prevent an occurrence of a crystal defect of the phosphor caused by a shortage of a halogen element. Moreover, this excessive addition is also used as a flux and contributes to reaction promotion and improvement of a crystal property.

According to one or more aspects of the present invention, at least a part of crystals included in the phosphor have a pyroxene crystal structure.

According to one or more aspects of the present invention, at least a part of crystals included in the phosphor belong to a crystal system being monoclinic, a Bravais lattice being a base-centered monoclinic lattice, and a space group being C2/m.

According to one or more aspects of the present invention, in an X-ray diffraction pattern using a Kα characteristic X-ray of Cu in at least a part of crystals included in the phosphor, when a diffraction intensity of a highest-intensity diffraction peak is set to 100 in which a diffraction angle 2θ exists in the range from 29.0° to 30.5°, peaks having at least a diffraction intensity of 8 or more exist in the range of $28.0° \leq 2\theta \leq 29.5°$; in the range of $19.0° \leq 2\theta \leq 22.0°$; in the range of $25.0° \leq 2\theta \leq 28.0°$; in the range of $34.5° \leq 2\theta \leq 37.5°$; and in the range of $40.0° \leq 2\theta \leq 42.5°$.

According to one or more aspects of the present invention, in an X-ray diffraction pattern using a Kα characteristic X-ray of Cu in at least a part of crystals included in the phosphor, when a diffraction intensity of a highest-intensity diffraction peak is set to 100 in which a diffraction angle 2θ exists in the range from 29.0° to 30.5°, a diffraction peak having a diffraction intensity of 50 or more exists in the range of $28.0° \leq 2\theta \leq 29.5°$;

a diffraction peak having a diffraction intensity of 8 or more exists in the range of $19.0° \leq 2\theta \leq 22.0°$;

a diffraction peak having a diffraction intensity of 15 or more exists in the range of $25.0° \leq 2\theta \leq 28.0°$;

a diffraction peak having a diffraction intensity of 15 or more exists in the range of $34.5° \leq 2\theta \leq 37.5°$;

a diffraction peak having a diffraction intensity of 10 or more exists in the range of $40.0° \leq 2\theta \leq 42.5°$; and a diffraction peak having a diffraction intensity of 10 or more exists in the range of $13.0° \leq 2\theta \leq 15.0°$.

According to one or more aspects of the present invention, in a diffraction pattern using a Kα characteristic X-ray of Mo in at least a part of crystals included in the phosphor, when a diffraction intensity of a highest-intensity diffraction peak is set to 100 in which a diffraction angle 2θ exists in the range from 12.5° to 15.0°, a diffraction peak having a diffraction intensity of 50 or more exists in the range of $12.0° \leq 2\theta \leq 14.5°$;

a diffraction peak having a diffraction intensity of 8 or more exists in the range of $8.0° \leq 2\theta \leq 10.5°$;

a diffraction peak having a diffraction intensity of 15 or more exists in the range of $11.0° \leq 2\theta \leq 13.0°$;

a diffraction peak having a diffraction intensity of 15 or more exists in the range of $15.5° \leq 2\theta \leq 17.0°$;

a diffraction peak having a diffraction intensity of 10 or more exists in the range of $17.5° \leq 2\theta \leq 19.5°$; and a diffraction peak having a diffraction intensity of 10 or more exists in the range of $5.0° \leq 2\theta \leq 8.0°$.

According to one or more aspects of the present invention, a phosphor includes a mixture of the crystals described above and the other crystal phase or amorphous phase, wherein a ratio of the crystals is 20 weight % or more in the mixture.

To obtain higher intensity in the phosphor of the invention, the amount of the crystals included in the phosphor is preferably as many as possible, the crystals are preferably formed of a mono-phase, and the content of the crystals is preferably 20 mass % or more. The light emitting intensity is remarkably improved more preferably if the content of the crystals is in the 50 mass % or more.

A mixture with the other crystal phase or amorphous phase may be used within the scope where characteristics do not deteriorate. Particularly, in a phosphor in which $SiO_2$ is excessively added and $SiO_2$-including crystals such as quartz, tridymite, and cristobalite are composed as by-products in the mixing ratio of the starting materials, a light emitting intensity may be improved.

In the phosphor of the invention, the use thereof is not limited particularly, but may be used as various light emitting devices by combining with an excitation light source.

In the light emitting device, when ultraviolet light or short-wavelength visible light is used as the excitation light source, a peak of an excitation spectrum of the phosphor of the invention is in a wavelength band of 350 to 430 nm, from the viewpoint of light emitting efficiency, light emitting brightness, or the like.

In the light emitting device, when the phosphor is used for a white light emitting device, a peak of light emitting spectrum of the phosphor of the invention is in a wavelength band of 560 to 590 nm, and a half-value width is 100 nm or more, from the viewpoint of a color rendering property or the like.

The phosphor of the invention has a strong excitation band in an ultraviolet light region or a short-wavelength visible light region and can efficiently emit visible light. Particularly, the phosphor is efficiently excited in a wavelength band near 400 nm to emit light with a broad light emitting spectrum.

When the phosphor is used, it is possible to obtain a light emitting device with a good color rendering property and high power. In addition, it is possible to obtain a white light emitting device with a good color rendering property and high power, by combining with another phosphor.

Other aspects and advantages of the present invention will be apparent from the following description, the drawings, and the claims.

DETAILED DESCRIPTION

Figure 1:
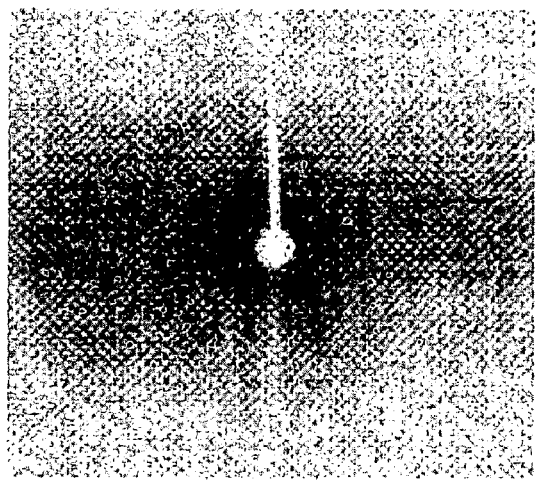
FIG. 1 is a diagram illustrating an example of an X-ray diffraction picture of a Mono-host crystal.

Hereinafter, exemplary embodiments of the invention will be described in detail, but the exemplary embodiments are not limited to the following examples.

A phosphor of the invention may be obtained as follows.

In the phosphor of the invention, compounds represented by the following composition formulas (1) to (4) may be used as raw materials.

(1) $M^1O_2$, where $M^1$ represents a quadrivalent element of Si, Ge, Ti, Zr, Sn, or the like.

(2) $M^2O$, where $M^2$ represents a divalent element of Mg, Ca, Sr, Ba, Zn, or the like.

(3) $M^3X_2$, where $M^3$ represents a divalent element of Mg, Ca, Sr, Ba, Zn, or the like, and X represents a halogen element.

(4) $M^4$, where $M^4$ represents a rare-earth element such as $Eu^{2+}$ and/or Mn.

For example, $SiO_2$, $GeO_2$, $TiO2$, $ZrO_2$, $SnO_2$, or the like may be used as the raw material in the composition formula (1).

For example, a carbonate, an oxide, a hydroxide, or the like of divalent metal ions may be used as the raw material in the composition formula (2). For example, $SrCl_2$, $SrCl_2.6H_2O$, $MgCl_2$, $MgCl_2.6H_2O$, $CaCl_2$, $CaCl_2.2H_2O$, $BaCl_2$, $BaCl_2.2H_2O$, $ZnCl_2$, $MgF_2$, $CaF_2$, $SrF_2$, $BaF_2$, $ZnF_2$, $MgBr_2$, $CaBr_2$, $SrBr_2$, $BaBr_2$, $ZnBr_2$, $MgI_2$, $CaI_2$, $SrI_2$, $BaI_2$, $ZnI_2$, or the like may be used as the raw material in the composition formula (3).

For example, $Eu_2O_3$, $Eu_2(CO_3)_3$, $Eu(OH)_3$, $EuCl_3$, or the like may be used as the raw material in the composition formula (4).

As the raw material in the composition formula (1), it is advantageous to use a compound that includes at least one element selected from the group consisting of Si, Ge, Ti, Zr, and Sn, in which $M^1$ essentially includes at least Si and a ratio of Si is 80 mol % or more.

As the raw material in the composition formula (2), it is advantageous to use a compound that includes at least one element selected from the group consisting of Mg, Ca, Sr, Ba, and Zn, in which $M^2$ essentially includes at least Ca and/or Sr and a ratio of Ca and/or Sr is 60 mol % or more.

As the raw material in the composition formula (3), it is advantageous to use a compound that includes at least one element selected from the group consisting of Mg, Ca, Sr, Mg, Ba, and Zn, in which $M^3$ essentially includes Sr and a ratio of Sr is 30 mol % or more, and where X is a halogen element essentially including at least Cl and a ratio of Cl is 50 mol % or more.

As the raw material in the composition formula (4), it is advantageous that $M^4$ is a rare-earth element essentially including divalent Eu and may include Mn and/or another rare-earth element in addition to Eu.

Mole ratio in the composition formulas (1) to (4) are weighed at the following ratio: (1): (2)=1:0.1 to 1.0, (2):(3)= 1:0.2 to 12.0, (2):(4)=1:0.05 to 4.0, preferably, (1): (2)=1: 0.25 to 1.0, (2):(3)=1:0.3 to 6.0, (2):(4)=1:0.05 to 3.0, more preferably, (1):(2)=1:0.25 to 1.0, (2):(3)=1:0.3 to 4.0, (2):(4)= 1:0.05 to 3.0. Then, the weighed raw materials are put into an alumina mortar, and the raw materials are pulverized and mixed for about 30 minutes, thereby obtaining a raw mixture. The raw mixture is put into an alumina crucible, and the raw mixture is baked in an electrical furnace of a reduction atmosphere, in an atmosphere (5/95) of ($H_2/N_2$), at a temperature of 900° C. to 1100° C. or less, for 3 to 40 hours, thereby obtaining a baked material. The baked material is minutely washed with warm pure water, and excess chloride is washed off, thereby obtaining a phosphor of the invention.

It is advantageous that the raw material (divalent metal halide) in the composition formula (3) is weighed in an amount in excess of the stoichiometry ratio. This is because a part of halogen element is evaporated in the course of baking the raw mixture, and it is possible to prevent an occurrence of a crystal defect of the phosphor caused by a shortage of a halogen element. In addition, the raw material added in excess of the stoichiometry ratio in the composition formula (3) becomes liquid at the baking temperature and serves as flux for the solid-phase reaction, so that the solid-phase reaction can be accelerated and also a crystalline property can be improved.

After baking the raw mixture, the raw material added in excess of the stoichiometry ratio in the composition formula (3) exists as impurities in the produced phosphor. Thus, in order to obtain a phosphor with high purity and high light emitting intensity, these impurities are washed off with warm pure water.

The composition ratio represented in the general formula of the phosphor of the invention is a composition ratio after washing impurities off, and the raw material added in excess of the stoichiometry ratio as impurities in the composition formula (3) as described above is not applied to this composition ratio.

According to the phosphor of the present invention, in order to obtain a phosphor having high luminous efficiency, it is advantageous to reduce a metallic element serving as impurity as much as possible. Especially, a transition metal element such as Fe, Co and Ni serves as an inhibitor that inhibits light emitting of the phosphor. Therefore, it is advantageous to use a raw material with high purity and to prevent impurities from being mixed in mixture process, such that total amount of the transition metal element is 500 ppm or less.

The phosphor of the invention may be used in various light emitting devices, in combination with an excitation light source.

As the excitation light source, for example, a semiconductor light emitting element such as an LED or an LD, a light source for obtaining light from vacuum discharge or thermoluminescence, an electron beam excitation light emitting element, or the like may be used.

Particularly, the phosphor of the invention is efficiently excited in a wavelength band near 400 nm to emit visible light with high light emitting intensity. Accordingly, it is advantageous to combine the phosphor with an excitation light source that emits light of a wavelength band near 400 nm.

Upon combining the excitation light source and the phosphor of the invention, powder of the phosphor is dispersed in a transparent resin having good light resistance, such as silicone, fluorine or sol-gel silica, and then the transparent resin in which the powder is dispersed is coated on the excitation light source, such as an LED, and then the transparent resin is cured so as to be fixed to the excitation light source.

As the light emitting device, for example, an LED, an LD, a fluorescent lamp, a vacuum fluorescent display (VFD), a field emission display (FED), a plasma display panel (PDP), a cathode ray tube (CRT), or the like may be used. Particularly, the phosphor of the invention is good in emitting yellow-based light, and it is possible to provide a white light emitting device by combining the phosphor with another phosphor and/or another light source and by adding and mixing colors. For example, an LED or an LD that emits short-wavelength visible light may be used as the excitation light source, and a blue phosphor other than the phosphor of the invention may be combined with the LED or the LD, thereby providing the white light emitting device.

<Crystal Structure of Phosphor of the Invention>

While growing mono-crystals of host crystals, the crystal structure or the like of the phosphor of the invention was defined on the basis of the analysis result thereof.

The host crystal is a substance that is represented by $M^1$=Si, $M^2$=Ca and Sr, $M^3$=Sr, and X=Cl in the general formula $M^1O_2 \cdot aM^2O \cdot bM^3X_2:M^4$ and does not include $M^4$.

<Production and Analysis of Host Crystal>

Mono-crystals of host crystals were grown and produced in the following order. Raw materials of $SiO_2$, CaO, and $SrCl_2$ are weighed so that a mole ratio thereof was $SiO_2$:CaO:$SrCl_2$=1:0.71:1.07. The weighed raw materials were put into an alumina mortar, and the raw materials were pulverized and mixed for about 30 minutes, thereby obtaining a raw mixture. This raw mixture was put into a tablet mold and was compression-molded at 100 MPa, thereby obtaining a mold. This mold was put into an alumina crucible and a lid was closed, and then the mold was baked in the air at 1030° C. for 36 hours, thereby obtaining a baked material. The baked material was washed with warm pure water and ultrasonic waves, thereby obtaining host crystals. Mono-crystals of Φ0.2 mm were obtained from the host crystals grown and produced as described above.

The obtained host crystals were subjected to element quantitative analysis in the following manner to define a composition ratio (i.e., the values of a and b in the general formula).

1. Quantitative Analysis of Si

The host crystals were melted with sodium carbonate in a platinum crucible and then were dissolved with dilute nitric acid to be constant. The Si amount of this solution was measured using ICP light emitting spectrum analyzer (manufactured by SII NanoTechnology Inc.: SPS-4000).

2. Quantitative Analysis of Metal Element

The host crystals were heated and decomposed under inert gas with perchloric acid, nitric acid, and hydrofluoric acid and then the decomposed result was dissolved with dilute nitric acid to be constant. The metal element amount of this solution was measured using ICP light emitting spectrum analyzer (manufactured by SII NanoTechnology Inc.: SPS-4000).

3. Quantitative Analysis of Cl

The host crystals were burned in a tube-shaped electrical furnace, and the generated gas was absorbed into absorption liquid. The Cl amount of this solution was determined by ion chromatography using DX-500 manufactured by Dionex Inc.

4. Quantitative Analysis of O

The host crystals were pyrolyzed in argon using nitrogen oxygen analyzer TC-436 manufactured by LECO Inc., and the generated oxygen was weighed by an infrared ray absorption method.

As a result of the element quantitative analysis, the general composition ratio of the obtained host crystals is as follows.

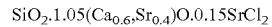

$SiO_2 \cdot 1.05(Ca_{0.6},Sr_{0.4})O \cdot 0.15SrCl_2$

A specific gravity of the host crystals measured by a pycnometer was 3.4.

An X-ray diffraction pattern using a Kα-ray (wavelength λ=0.71 Å) of Mo in the mono-crystals of the host crystals was measured by an imaging plate mono-crystal automatic X-ray structure analyzer (manufactured by RIGAKU: R-AXIS RAPID) (Hereinafter, referred to as Measurement 1). An example of X-ray diffraction picture obtained by Measurement 1 is shown in FIG. 1.

The following crystal structure was analyzed using 5709 diffraction spots obtained in the range of 2θ<60° (d>0.71 Å) by Measurement 1.

A crystal system, a Bravais lattice, a space group, and a lattice constant of the host crystals were determined as follows using a data processing software (produced by RIGAKU: RapidAuto), from the X-ray diffraction pattern of Measurement 1.

Crystal system: monoclinic
Bravais lattice: base-centered monoclinic lattice
Space group: C2/m
Lattice Constant:

$a$=13.3036(12) Å

$b$=8.3067(8) Å

$c$=9.1567(12) Å

$\alpha=\gamma=90°$ $\beta=110.226(5)°$ $v=949.50(18)$ Å$^3$

Using a crystal structure analysis software (produced by RIGAKU: Crystal structure), a general structure was determined by a direct method, and then structural parameters (occupancy, atomic coordinates, temperature factor, etc.) were refined by a minimum square method.

The refinement was performed with respect to |F| independent 1160 points of |F|>2σ$_F$. As a result, a crystal structure model with reliability factor R$_1$=2.7% was obtained. The crystal structure model is hereinafter referred to as "initial structure model".

The atomic coordinates of the initial structure model obtained from the mono-crystals are shown in Table 1.

TABLE 1

Atomic coordinates of initial structure model obtained from mono-crystals

| Elements | Site | x | y | z | Occupancy |
|---|---|---|---|---|---|
| Ca1 | 2c | 0.0000 | 0.0000 | 0.5000 | 1 |
| Sr2 | 4i | 0.28471 (5) | 0.5000 | 0.07924 (6) | 1 |
| Sr3 | 8j | 0.09438 (5) | 0.74970 (8) | 0.24771 (6) | 0.427 (5) |
| Ca3 | 8j | 0.09438 (5) | 0.74970 (8) | 0.24771 (6) | 0.573 (5) |
| Cl1 | 2b | 0.0000 | 0.5000 | 0.0000 | 1 |
| Cl2 | 2a | 0.0000 | 0.0000 | 0.0000 | 1 |
| Si1 | 4i | 0.2323 (1) | 0.5000 | 0.4989 (2) | 1 |
| Si2 | 8j | −0.15109 (9) | 0.6746 (1) | 0.2854 (1) | 1 |
| O1 | 4i | −0.0985 (3) | 0.5000 | 0.2645 (5) | 1 |
| O2 | 4i | 0.1987 (3) | 0.5000 | 0.3145 (4) | 1 |
| O3 | 4i | 0.3575 (3) | 0.5000 | 0.6019 (5) | 1 |
| O4 | 8j | 0.1734 (2) | 0.3423 (3) | 0.5469 (3) | 1 |
| O5 | 8j | −0.2635 (2) | 0.7007 (3) | 0.1478 (3) | 1 |
| O6 | 8j | −0.0677 (2) | 0.8154 (4) | 0.2941 (3) | 1 |

The composition ratio of the initial structure model obtained from the mono-crystals was calculated as follow.

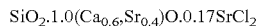

$SiO_2 \cdot 1.0(Ca_{0.6},Sr_{0.4})O \cdot 0.17SrCl_2$

As an analysis result, the crystals of the invention were identified as crystals with a structure which has not been registered in the International Center for Diffraction Data (ICDD) that is an X-ray diffraction database widely used for X-ray diffraction.

Subsequently, powder host crystals having the same form as the phosphor were adjusted, and it was examined whether the host crystals has the crystal structure belonging to the initial structure model.

The powder host crystals were adjusted in the following order. First, raw materials of SiO$_2$, CaO, SrO, and SrCl$_2$ were weighed so that a mole ratio thereof was SiO$_2$:CaO:SrO:SrCl$_2$=1.0:0.7:0.2:1.0. The weighed raw materials were put into an alumina mortar, and the raw materials were pulverized and mixed for about 25 minutes, thereby obtaining a raw mixture. The raw mixture was put into a tablet mold and was compression-molded at 100 MPa, thereby obtaining a mold. This mold was put into an alumina crucible and a lid was closed, and then the mold was baked at 1030° C. for 5 to 20 hours, thereby obtaining a baked material. The baked material was washed with warm pure water and ultrasonic waves, thereby obtaining powder crystals.

To obtain a detail crystal structure of the powder host crystal, a powder X-ray diffraction was measured using a Kα characteristic X-ray of Mo by a high resolution-limit powder X-ray diffraction device (manufactured by RIGAKU: specially ordered product) (hereinafter, referred to as Measurement 2).

On the basis of the result of Measurement 2, Rietveld analysis was performed to determine a crystal structure. In the Rietveld analysis, the lattice constant model was refined by the least squares method using the atomic coordinates, and the space group of the initial structure model.

As a result, the diffraction pattern observed in Measurement 2 and the calculated diffraction pattern fitted by the Rietveld analysis were substantially matched with each other, and an R factor representing a matching index indicated a very small value as Rwp=2.84%. Accordingly, it was identified that the host crystals of the mono-crystals and the powder host crystals were crystals having the same structure.

Figure 2:
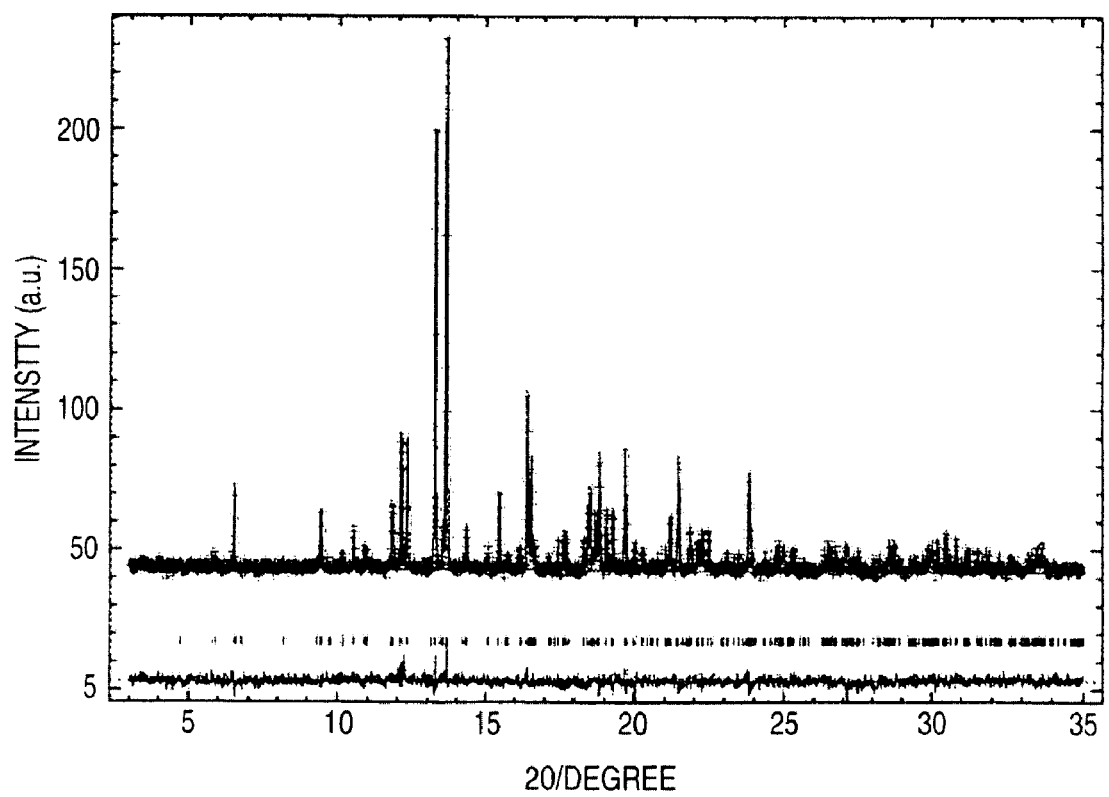
FIG. 2 is a fitting diagram of X-ray diffraction (Measurement 2) of a powder host crystal.

FIG. 2 illustrates a Rietveld analysis fitting diagram with respect to Measurement 2. In the upper portion in FIG. 2, a solid line denotes the powder X-ray diffraction pattern calculated by the Rietveld analysis, a cross block denotes the powder X-ray diffraction pattern observed by Measurement 2. The middle portion in FIG. 2 denotes a peak angle of diffraction calculated by the Rietveld analysis. The lower portion in FIG. 2 denotes that difference between the calculated value and the observed value of the powder X-ray diffraction pattern are plotted, in which both have substantially no difference and are substantially matched with each other.

The lattice constants of the refined powder host crystals are shown below.

$a$=13.2468(4) Å, $b$=8.3169(2) Å, $c$=9.1537(3) Å

$\alpha=\gamma=90°$, $\beta=110.251(2)°$ $v=946.1(1)$ Å$^3$

The calculated element coordinates of the powder host crystals are shown in Table 2.

TABLE 2

| Elements | Site | x | y | z | Occupancy |
|---|---|---|---|---|---|
| Ca1 | 2c | 0.0000 | 0.0000 | 0.5000 | 1 |
| Sr2 | 4i | 0.28441 (6) | 0.5000 | 0.07876 (9) | 1 |
| Sr3 | 8j | 0.0947 (1) | 0.7501 (2) | 0.2476 (2) | 0.340 |
| Ca3 | 8j | 0.0947 (1) | 0.7501 (2) | 0.2476 (2) | 0.660 |
| Cl1 | 2b | 0.0000 | 0.5000 | 0.0000 | 1 |
| Cl2 | 2a | 0.0000 | 0.0000 | 0.0000 | 1 |
| Si1 | 4i | 0.2314 (1) | 0.5000 | 0.4975 (2) | 1 |
| Si2 | 8j | 0.15127 (9) | 0.3253 (1) | 0.7146 (1) | 1 |
| O1 | 4i | 0.1003 (3) | 0.5000 | 0.7376 (4) | 1 |
| O2 | 4i | 0.1977 (2) | 0.5000 | 0.3187 (4) | 1 |
| O3 | 4i | 0.3549 (3) | 0.5000 | 0.5999 (4) | 1 |
| O4 | 8j | 0.1719 (2) | 0.3418 (2) | 0.5463 (3) | 1 |
| O5 | 8j | 0.2629 (2) | 0.3003 (3) | 0.8527 (3) | 1 |
| O6 | 8j | 0.0680 (2) | 0.1850 (3) | 0.7055 (2) | 1 |

A theoretical composition ratio of the powder host crystals, which is calculated by the Rietveld analysis on the basis of Measurement 2, is shown below.

<Theoretical Composition Ratio of Powder Host Crystals>

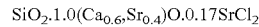

$SiO_2 \cdot 1.0(Ca_{0.6},Sr_{0.4})O \cdot 0.17SrCl_2$

In the host crystals, elements capable of forming solid solution are enumerated below.

Herein, a solid solution means one having a lattice constant different from the host crystals but having the same crystal structure, in which a composition ratio of elements constituting the host crystals is varied or a part of elements constituting the host crystals is substituted by an extra element.

<Element Group Solid-Soluble into Host Crystals>
Substituent of Si in SiO$_2$: Ge, Ti, Zr, and Sn
Substituent of Ca or Sr in (Ca,Sr)O: Mg, Sr, Ba, and Zn
Substituent of Sr in SrCl$_2$: Mg, Ca, Ba, and Zn
Substituent of Sr in SrCl$_2$: F, Br, and I
A part of SiO$_2$ formed of an oxide of an element in Group 4 may be substituted by ½(B,P)O$_4$, ½(Al,P)O$_4$.

<Identification of Crystal Structure of Phosphor of the Invention>

The identification of the crystal structure of the solid solution may be judged by identity of the diffraction result of X-ray diffraction or neutron-ray diffraction, but crystals in which a part of constituent elements is substituted by the other solid-soluble element from raw crystals have a varied lattice constant. Accordingly, even in any crystal belonging to the same crystal structure as the raw crystals, the diffraction result is not completely the same.

In the crystals belonging to the same crystal structure, when the lattice constant gets smaller by the element substitution, a diffraction angle is shifted to a high angle. When the lattice constant gets larger, the diffraction angle is shifted to a low angle.

In this case, evaluation was performed using the following two kinds of judgment methods, according to whether the phosphor (Example 1 and 2) of the invention in which the powder host crystals and a part of Ca and/or Sr ($M^2$ element in the general formula) constituting the host crystals are substituted by $Eu^{2+}$ ($M^4$ element in the general formula) belongs the same crystal structure.

In case of crystals having a small solid amount as a judgment method of simply identifying a crystal structure, when peak positions (2θ) of an X-ray diffraction chart obtained from an X-ray diffraction result accords with main peaks, it is possible to judge that both of the crystal structures are the same.

In addition, it is advantageous to use about ten having the strongest diffraction intensity as the main peaks used for the judgment.

Figure 3:
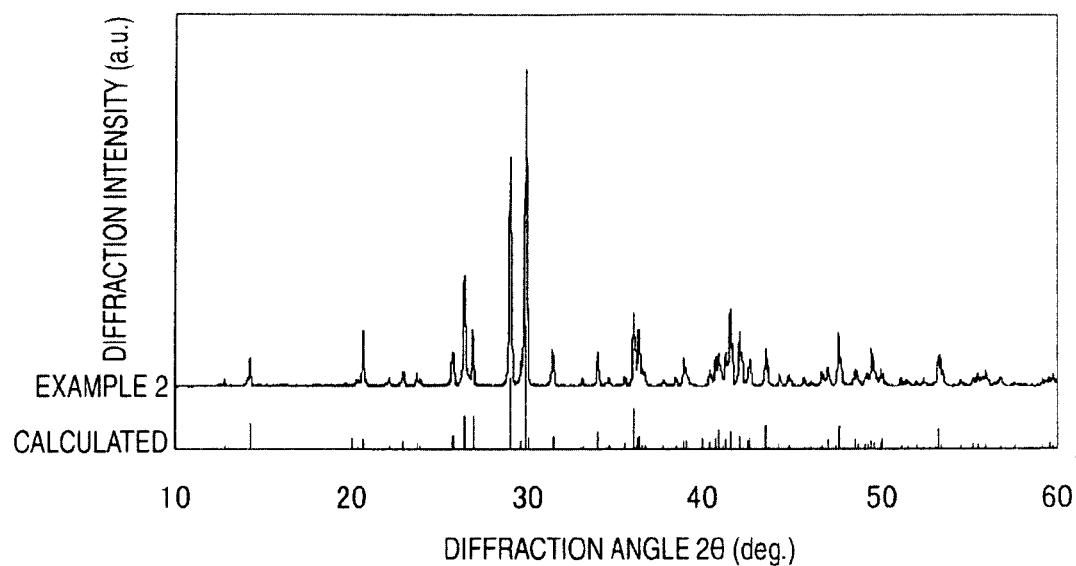
FIG. 3 is a diagram illustrating an X-ray diffraction chart of a powder host crystal and a phosphor according to Example 2 of the invention.

In FIG. 3, an X-ray diffraction chart of the phosphor and the powder host crystals is shown. The upper portion is an X-ray diffraction pattern of the phosphor (Example 2) of the invention using wavelengths of a Kα characteristic X-ray of Cu. The lower portion is an X-ray diffraction pattern calculated from the crystal structure of the powder host crystals determined by the Rietveld analysis using wavelengths of the Kα characteristic X-ray of Cu. From FIG. 3, both of the X-ray charts well accord with each other about main peaks.

More specifically, as a judgment method for determining a crystal structure, it can be judged whether crystals have the same structure by performing Rietveld analysis on the result of X-ray diffraction (or neutron-ray diffraction) for judgment and by obtaining an R factor, using the lattice constant, the element coordinates, and the space group of the initial crystal model as a model. Particularly, when the Rietveld analysis for judgment is converged to a value of low R factor having the same level as the Rietveld analysis of the powder host crystals, it can be judged of that the crystals have the same structure. A fine difference in structure may be discriminated by comparing the lattice constant or the element coordinates obtained by the Rietveld analysis.

Figure 4:
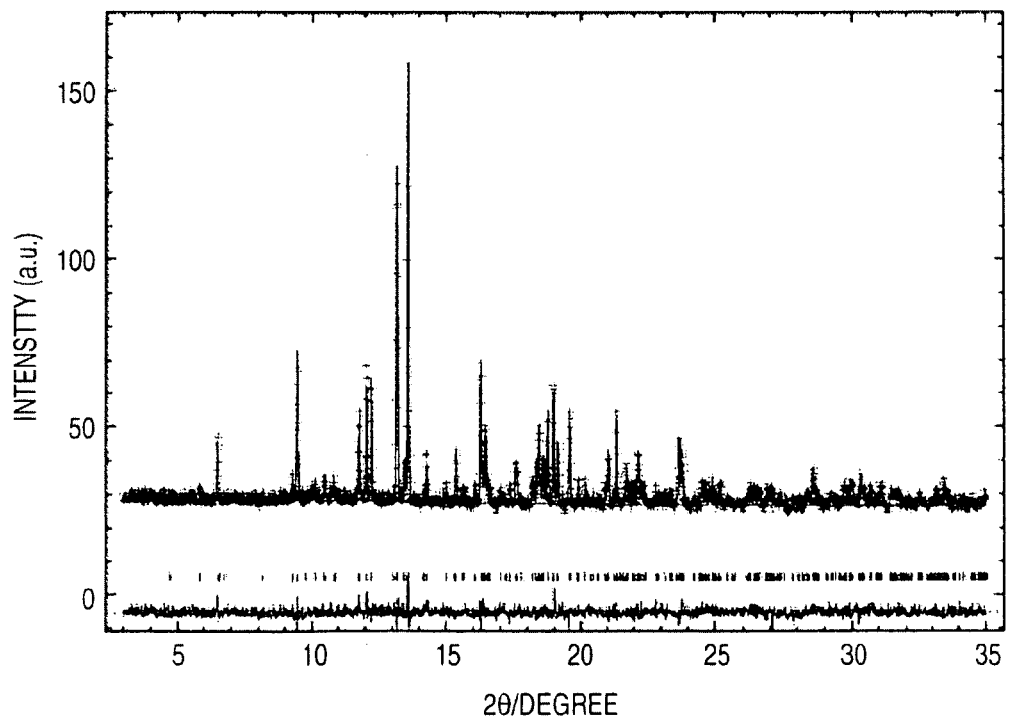
FIG. 4 is a fitting diagram of X-ray diffraction (Measurement 3) of a phosphor according to Example 1 of the invention.

To use such a judgment method, an X-ray diffraction pattern of the phosphor (Example 1) of the invention was measured under the same condition as Measurement 2 (hereinafter, referred to as Measurement 3). The Rietveld analysis using the initial structure model as a model was performed on the basis of the obtained X-ray diffraction pattern. As a result, a value of the R factor $R_{WP}$ was very small, i.e., 3.69%, and the value was converged in the same level as the value of $R_{WP}$ of the powder host crystals. In FIG. 4, a Rietveld analysis fitting degree about Measurement 3 is shown. In the upper portion in FIG. 4, a solid line denotes the powder X-ray diffraction pattern calculated by the Rietveld analysis, a cross block denotes the powder X-ray diffraction pattern observed by Measurement 3. The middle portion in FIG. 4 denotes a peak angle of diffraction calculated by the Rietveld analysis. The lower portion in FIG. 4 denotes that difference between the calculated value and the observed value of the powder X-ray diffraction pattern are plotted, in which both have substantially no difference and are substantially matched with each other. As described above, it is judged that the phosphor has the same crystal structure as the host crystals.

Hereinafter, the invention will be described in more detail by reference to examples. The phosphor of the invention is described by way of certain examples. However, the following description of the chemical composition, raw materials, production methods, or the like does not restrict the exemplary embodiments of the phosphor of the invention.

EXAMPLE 1

A phosphor represented by $SiO_2.0.9(Ca_{0.5},Sr_{0.5})O.0.17SrCl_2:Eu^{2+}_{0.1}$ was used. The phosphor of Example 1 satisfies the following relationships: $M^1$=Si, $M^2$=Ca/Sr (mole ratio: 50/50), $M^3$=Sr, X=Cl, $M^4$=$Eu^{2+}$, a=0.9, b=0.17, and content c (mole ratio) of $M^4$ satisfies c/(a+c)=0.1, in the formula $M^1O_2.aM^2O.bM^3X_2:M^4$.

Example 1 was produced as follows.

Raw materials of $SiO_2$, $Ca(OH)_2$, $SrCl_2.6H_2O$, and $Eu_2O_3$ were weighed so that a mole ratio thereof satisfies $SiO_2$:Ca$(OH)_2$:$SrCl_2.6H_2O$:$Eu_2O_3$=1.0:0.65:1.0:0.13, the weighed materials were put into an alumina mortar, and the materials were pulverized and mixed for about 30 minutes, thereby obtaining a raw mixture. The raw mixture was put into an alumina crucible and was baked in an electrical furnace of a reduction atmosphere, in an atmosphere of (5/95) of (H2/N2), at 1030° C., for 5 to 20 hours, thereby obtaining a baked material. The baked material was washed with warm pure water, thereby obtaining a phosphor of Example 1.

EXAMPLE 2

A phosphor represented by $SiO_2.0.95(Ca_{0.65},Sr_{0.35})O.0.17SrCl_2:Eu^{2+}_{0.05}$ was used. The phosphor of Example 2 satisfies the following relationships: $M^1$=Si, $M^2$=Ca/Sr (mole ratio: 65/35), $M^3$=Sr, X=Cl, $M^4$=$Eu^{2+}$, a=0.95, b=0.17, and content c (mole ratio) of $M^4$ satisfies c/(a+c)=0.05, in the formula $M^1O_2.aM^2O.bM^3X_2:M^4$.

Example 2 was produced as follows.

Raw materials of $SiO_2$, $Ca(OH)_2$, $SrCl_2.6H_2O$, and $Eu_2O_3$ were weighed so that a mole ratio thereof satisfies $SiO_2$:Ca$(OH)_2$:$SrCl_2.6H_2O$:$Eu_2O_3$=1.0:0.77:1.0:0.07, and then the same manner as Example 1 was applied, thereby obtaining a phosphor of Example 2.

EXAMPLE 3

A phosphor represented by $SiO_2.0.84(Ca_{0.55},Sr_{0.45})O.0.17SrCl_2:Eu^{2+}_{0.16}$ was used. The phosphor of Example 3 satisfies the following relationships: $M^1$=Si, $M^2$=Ca/Sr (mole ratio: 55/45), $M^3$=Sr, X=Cl, $M^4$=$Eu^{2+}$, a=0.84, b=0.17, and content c (mole ratio) of $M^4$ satisfies c/(a+c)=0.16, in the formula $M^1O_2.aM^2O.bM^3X_2:M^4$.

Example 3 was produced as follows.

Raw materials of $SiO_2$, $Ca(OH)_2$, $SrCl_2.6H_2O$, and $Eu_2O_3$ were weighed so that a mole ratio thereof satisfies $SiO_2$:Ca$(OH)_2$:$SrCl_2.6H_2O$:$Eu_2O_3$=1.0:0.52:1.0:0.19, and then the same manner as Example 1 was applied, thereby obtaining a phosphor of Example 3.

EXAMPLE 4

A phosphor represented by $SiO_2.0.9(Ca_{0.6},Sr_{0.4})O.0.17SrCl_2:Eu^{2+}_{0.1}$ was used. The phosphor of Example 4 satisfies the following relationships: $M^1$=Si, $M^2$=Ca/Sr (mole ratio: 60/40), $M^3$=Sr, X=Cl, $M^4$=$Eu^{2+}$, a=0.9, b=0.17, and content c (mole ratio) of $M^4$ satisfies c/(a+c)=0.1, in the formula $M^1O_2 \cdot aM^2O \cdot bM^3X_2:M^4$.

In Example 4, cristobalite is generated in the phosphor by excessively adding $SiO_2$ in the mixing ratio of raw materials.

Example 4 was produced as follows.

Raw materials of $SiO_2$, $Ca(OH)_2$, $SrCl_2 \cdot 6H_2O$, and $Eu_2O_3$ were weighed so that a mole ratio thereof satisfies $SiO_2$:Ca$(OH)_2$:$SrCl_2 \cdot 6H_2O$:$Eu_2O_3$=1.1:0.45:1.0:0.13, and then the same manner as Example 1 was applied, thereby obtaining a phosphor of Example 4.

EXAMPLE 5

A phosphor represented by $SiO_2 \cdot 0.86(Ca_{0.47},Sr_{0.52},Ba_{0.01})$O·$0.17SrCl_2$:$Eu^{2+}_{0.14}$ was used. The phosphor of Example 5 satisfies the following relationships: $M^1$=Si, $M^2$=Ca/Sr/Ba (mole ratio: 47/52/1), $M^3$=Sr, X=Cl, $M^4$=$Eu^{2+}$, a=0.86, b=0.17, and content c (mole ratio) of $M^4$ satisfies c/(a+c)= 0.14, in the formula $M^1O_2 \cdot aM^2O \cdot bM^3X_2:M^4$.

In Example 5, the element $M^2$ further contains Ba in addition to Ca and Sr, and cristobalite is generated in the phosphor by excessively adding $SiO_2$ in the mixing ratio of raw materials.

Example 5 was produced as follows.

Raw materials of $SiO_2$, $CaCO_3$, $BaCO_3$, $SrCl_2 \cdot 6H_2O$ and $Eu_2O_3$ were weighed so that a mole ratio thereof satisfies $SiO_2$:$CaCO_3$:$BaCO_3$:$SrCl_2 \cdot 6H_2O$:$Eu_2O_3$=1.68:0.45:0.02: 1.0:0.13, and then the same manner as Example 1 was applied, thereby obtaining a phosphor of Example 5.

EXAMPLE 6

A phosphor represented by $SiO_2 \cdot 0.86(Ca_{0.49},Sr_{0.50},Mg_{0.01})$O·$0.17SrCl_2$:$Eu^{2+}_{0.14}$ was used. The phosphor of Example 6 satisfies the following relationships: $M^1$=Si, $M^2$=Ca/Sr/Mg (mole ratio: 49/50/1), $M^3$=Sr, X=Cl, $M^4$=$Eu^{2+}$, a=0.86, b=0.17, and content c (mole ratio) of $M^4$ satisfies c/(a+c)=0.14, in the formula $M^1O_2 \cdot aM^2O \cdot bM^3X_2$:$M^4$.

In Example 6, the element $M^2$ further contains Mg in addition to Ca and Sr, and cristobalite is generated in the phosphor by excessively adding $SiO_2$ in the mixing ratio of raw materials.

Example 6 was produced as follows.

Raw materials of $SiO_2$, $CaCO_3$, $MgCO_3$, $SrCl_2 \cdot 6H_2O$ and $Eu_2O_3$ were weighed so that a mole ratio thereof satisfies $SiO_2$:$CaCO_3$:$MgCO_3$:$SrCl_2 \cdot 6H_2O$:$Eu_2O_3$=1.68:0.45:0.02: 1.0:0.13, and then the same manner as Example 1 was applied, thereby obtaining a phosphor of Example 6.

Composition ratios of Examples 1 to 6 were measured and determined based on respective data about crystal structure of the above-described host crystal, using an electron probe micro analyzer (manufactured by JEOL Ltd.: JOEL JXA-8800R)

COMPARATIVE EXAMPLE

A phosphor (produced by Kasei Optonix, Ltd.) represented by $BaMgAl_{10}O_{17}$:Eu,Mn was used as a Comparative Example 1. This phosphor is known for good light resistance in phosphors of green light emission of near-ultraviolet excitation listed in the Japanese government project "Logic Model of Development of Highly Efficient LED (Plan for Light of 21st-Century)"

Light emitting intensities of the phosphors of Examples 1 to 6 and the Comparative Example 1 under excitation of 400 nm were measured. The measurement result is shown in Table 3 as relative values in which the light emitting intensity of the phosphor of Comparative Example 1 is 100.

TABLE 3

|  | Integral light emitting intensity ratio | Light emitting peak wavelength (nm) |
|---|---|---|
| Example 1 | 143 | 587 |
| Example 2 | 130 | 587 |
| Example 3 | 145 | 585 |
| Example 4 | 191 | 579 |
| Example 5 | 180 | 579 |
| Example 6 | 190 | 579 |
| Comparative Example 1 | 100 | 515 |

Integral light emitting intensity ratio is a relative value when the integral light emitting intensity ratio of the phosphor of Comparative Example 1 is 100.

As shown in Table 3, the phosphors of Examples 1 to 6 represent integral light emitting intensities at least 1.3 times that of Comparative Example 1. Thus, the phosphors of Examples 1 to 6 are efficiently excited in a wavelength band near 400 nm to emit visible light with high light emitting intensity.

In the mixing ratio of raw materials, Examples 4 to 6 in which cristobalite is generated in the phosphor by excessively adding $SiO_2$ represent a better light emitting property than Examples 1 to 3.

Figure 5:
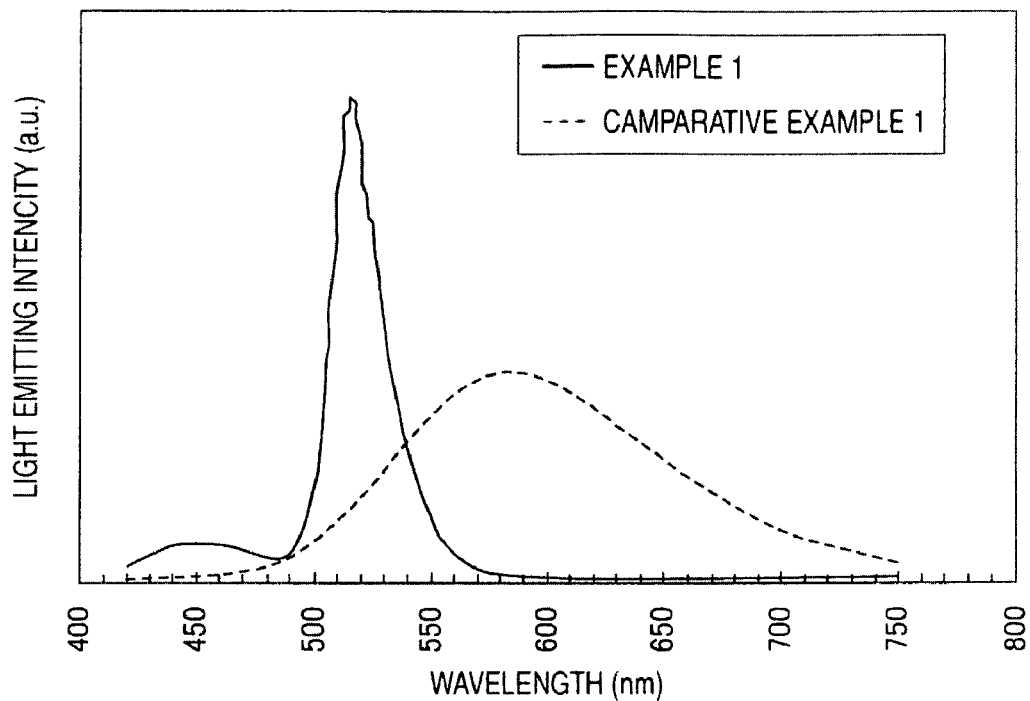
FIG. 5 is a diagram illustrating a light emitting spectrum (dotted line) of a phosphor according to Example 1 of the invention and a light emitting spectrum (solid line) of a phosphor according to Comparative Example 1.

FIG. 5 illustrates light emitting spectrum (dotted line) of a phosphor of Example 1 and light emitting spectrum (solid line) of Comparative Example 1, under excitation of 400 nm.

Figure 6:
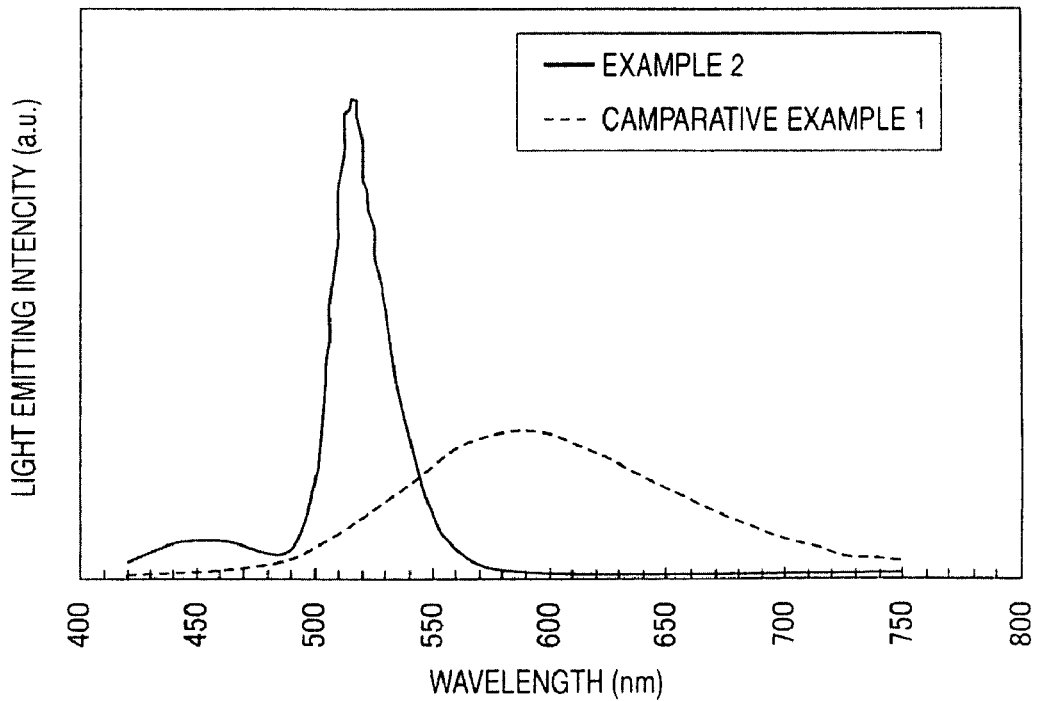
FIG. 6 is a diagram illustrating a light emitting spectrum (dotted line) of a phosphor according to Example 2 of the invention and a light emitting spectrum (solid line) of a phosphor according to Comparative Example 1.

FIG. 6 illustrates light emitting spectrum (dotted line) of a phosphor of Example 2 and light emitting spectrum (solid line) of Comparative Example 1, under excitation of 400 nm.

Figure 7:
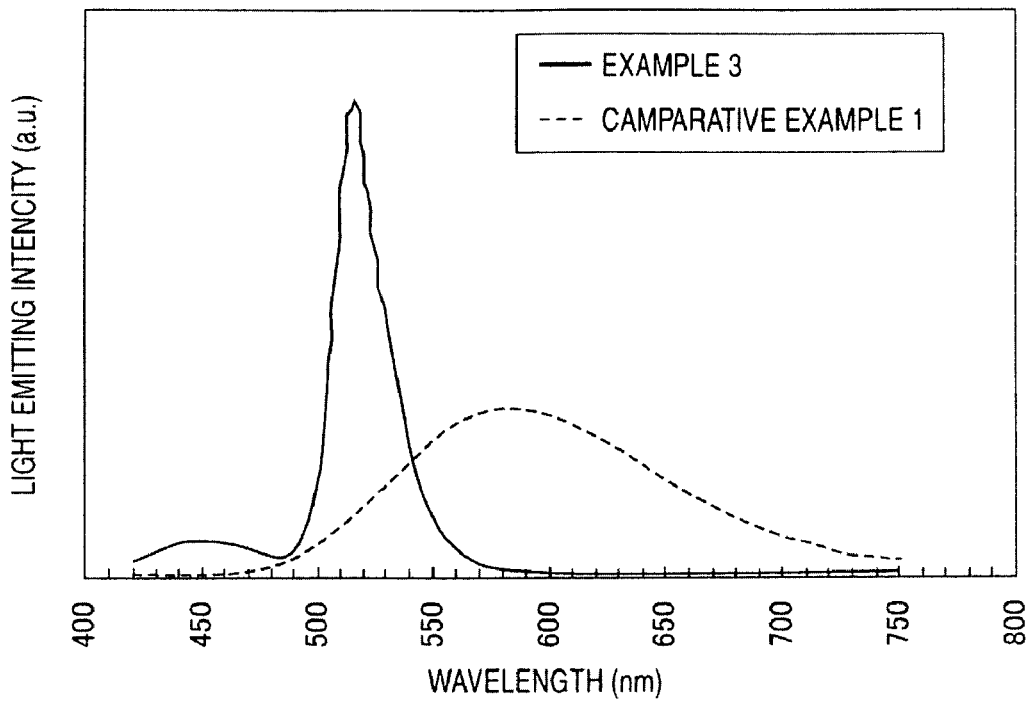
FIG. 7 is a diagram illustrating a light emitting spectrum (dotted line) of a phosphor according to Example 3 of the invention and a light emitting spectrum (solid line) of a phosphor according to Comparative Example 1.

FIG. 7 illustrates light emitting spectrum (dotted line) of a phosphor of Example 3 and light emitting spectrum (solid line) of Comparative Example 1, under excitation of 400 nm.

Figure 8:
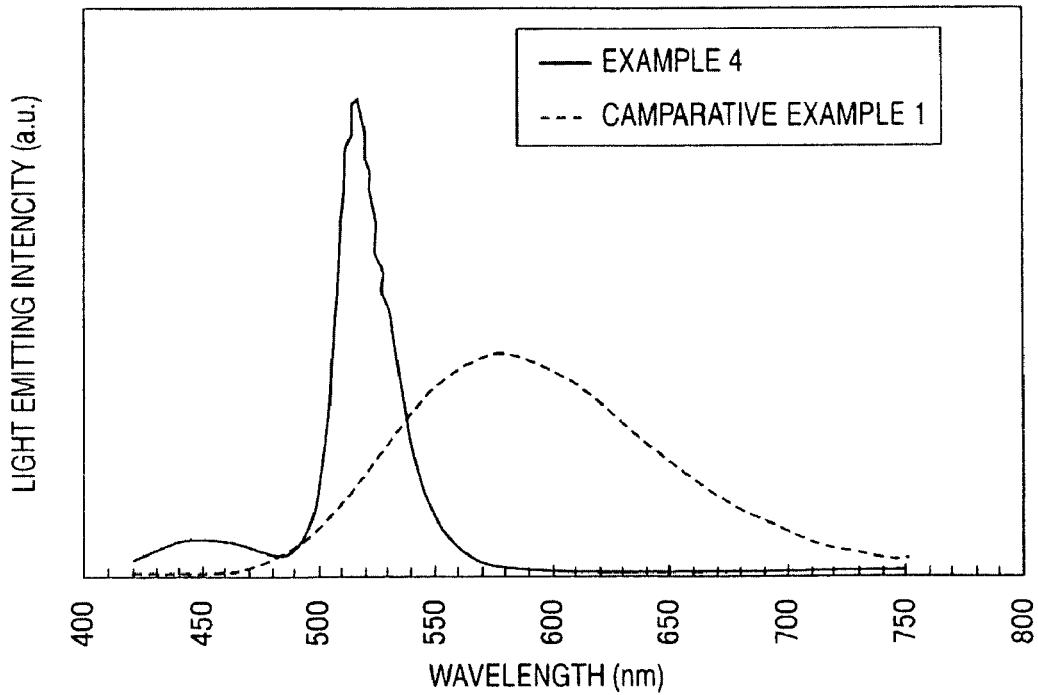
FIG. 8 is a diagram illustrating a light emitting spectrum (dotted line) of a phosphor according to Example 4 of the invention and a light emitting spectrum (solid line) of a phosphor according to Comparative Example 1.

FIG. 8 illustrates light emitting spectrum (dotted line) of a phosphor of Example 4 and light emitting spectrum (solid line) of Comparative Example 1, under excitation of 400 nm.

Figure 9:
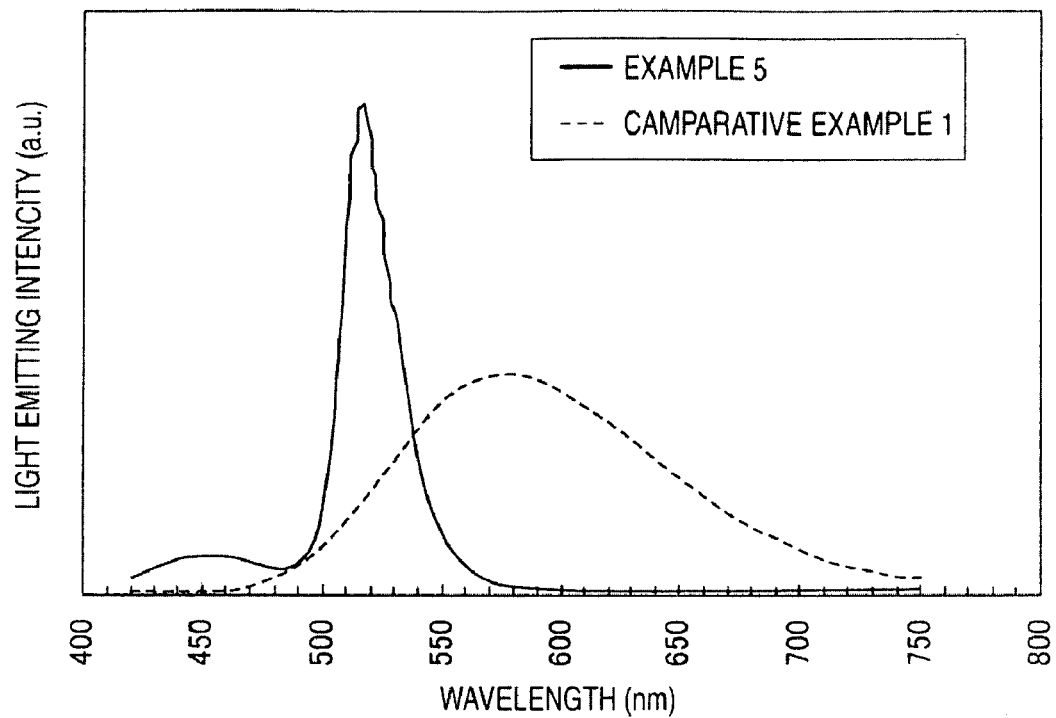
FIG. 9 is a diagram illustrating a light emitting spectrum (dotted line) of a phosphor according to Example 5 of the invention and a light emitting spectrum (solid line) of a phosphor according to Comparative Example 1.

FIG. 9 illustrates light emitting spectrum (dotted line) of a phosphor of Example 5 and light emitting spectrum (solid line) of Comparative Example 1, under excitation of 400 nm.

Figure 10:
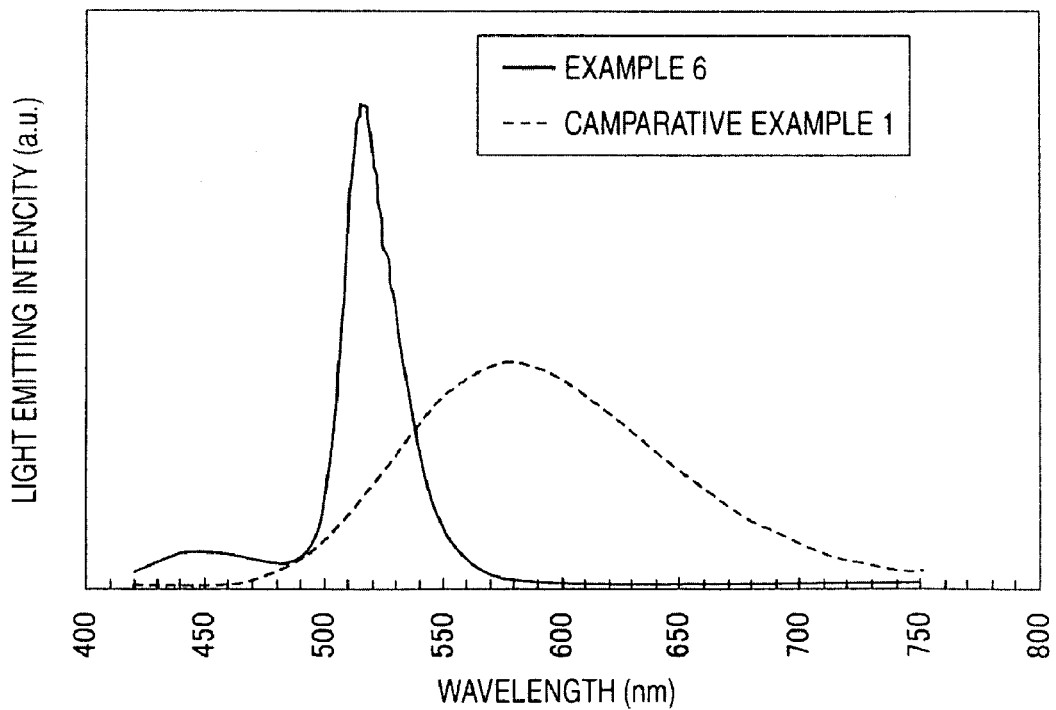
FIG. 10 is a diagram illustrating a light emitting spectrum (dotted line) of a phosphor according to Example 6 of the invention and a light emitting spectrum (solid line) of a phosphor according to Comparative Example 1.

FIG. 10 illustrates light emitting spectrum (dotted line) of a phosphor of Example 6 and light emitting spectrum (solid line) of Comparative Example 1, under excitation of 400 nm.

A vertical axis of the graphs shown in FIGS. 5 to 10 denotes a light emitting intensity relative to Comparative Example 1.

As shown in FIGS. 5 to 10, all the phosphors of Examples 1 to 6 have peaks of the light emitting spectrum in a wavelength band of 560 to 590 nm, and half-value widths thereof are 100 nm or more. Accordingly, the phosphors of Examples 1 to 6 emit broad visible light with a high color rendering property.

Figure 11:
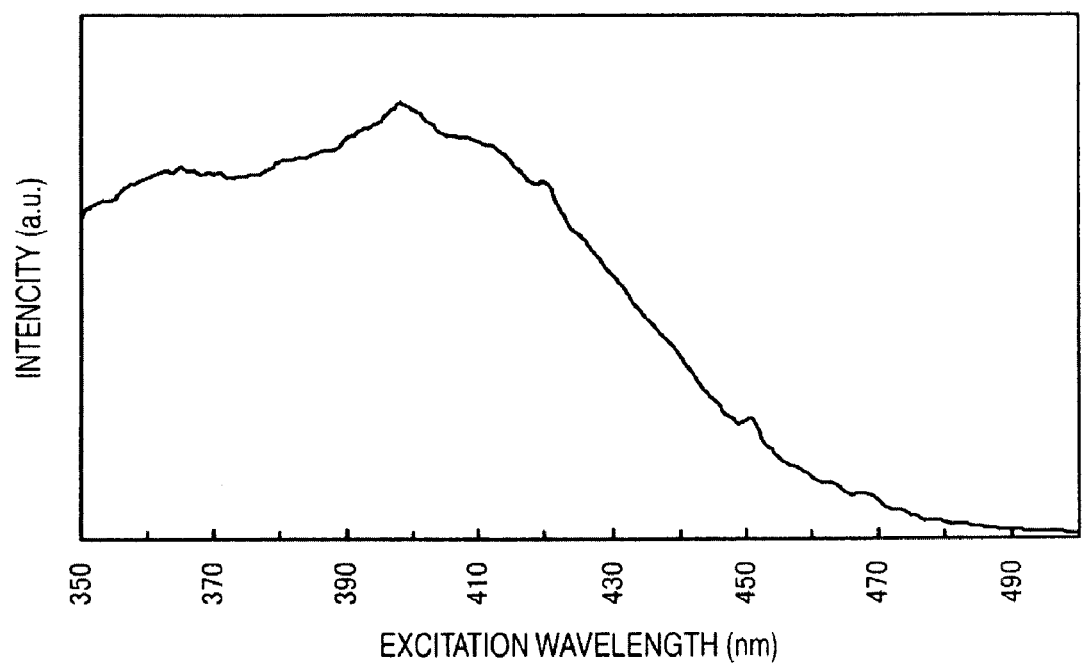
FIG. 11 is a diagram illustrating an excitation spectrum of the phosphor according to Example 1 of the invention.

FIG. 11 illustrates an excitation spectrum of the phosphor of Example 1.

As shown in FIG. 11, in the phosphor of Example 1, a peak of excitation spectrum is in a wavelength band of 350 to 430 nm. Thus, the phosphor of Example 1 is efficiently excited in a wavelength band near 400 nm.

As shown in FIG. 11, the phosphor of Example 1 hardly absorbs light in a wavelength band of 450 to 480 nm. Thus, the phosphor of Example 1 has small color shift since the phosphor does not absorb blue color, at the time of combining with blue color to form composed white light.

Figure 12:
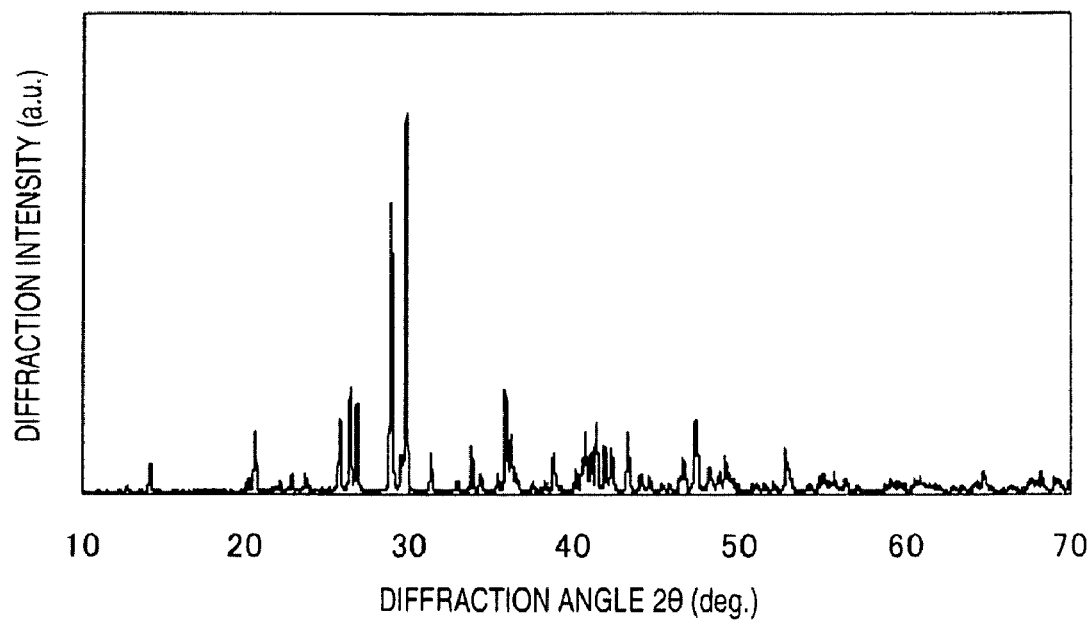
FIG. 12 is a diagram illustrating a measurement result of X-ray diffraction using a Kα characteristic X-ray of Cu in the phosphor according to Example 1 of the invention.

FIG. 12 is a diagram illustrating a measurement result of X-ray diffraction using a Kα characteristic X-ray of Cu in the phosphor according to Example 1 of the invention.

Figure 13:
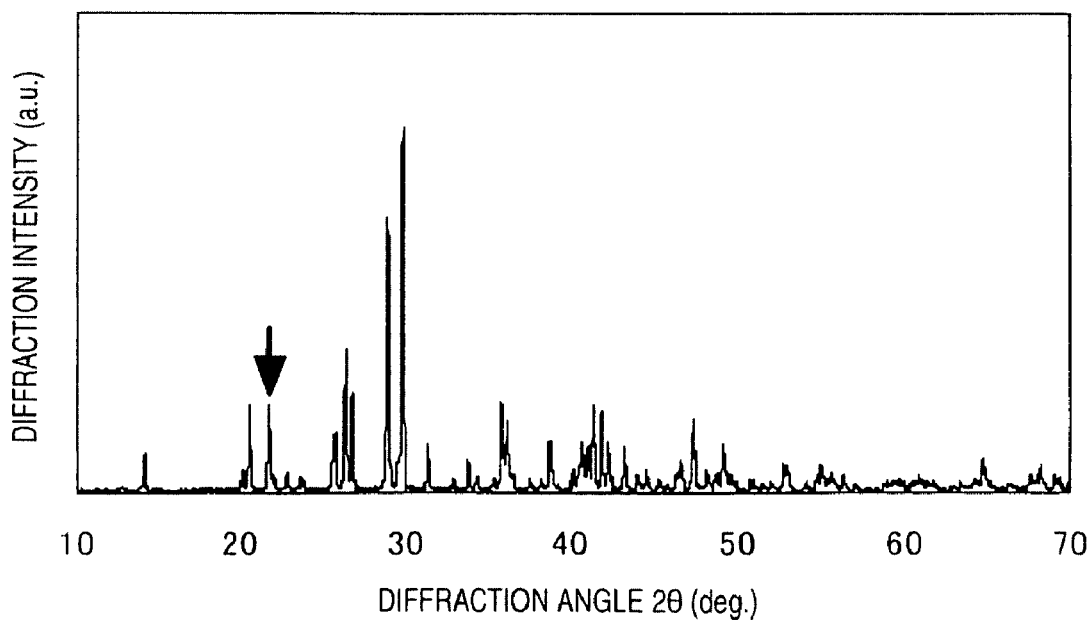
FIG. 13 is a diagram illustrating a measurement result of X-ray diffraction using a Kα characteristic X-ray of Cu in the phosphor according to Example 4 of the invention.

FIG. 13 is a diagram illustrating a measurement result of X-ray diffraction using a Kα characteristic X-ray of Cu in the phosphor according to Example 4 of the invention.

As shown in FIGS. 12 and 13, in both of X-ray diffraction patterns using a Kα characteristic X-ray of Cu, when the highest diffraction intensity of a diffraction peak is set to 100 in which a diffraction angle 2θ exists in the range from 29.0° to 30.5°, a diffraction peak representing a diffraction intensity of 50 or more exists in the range where the diffraction angle 2θ is 28.0° or more to 29.5° or less, a diffraction peak representing a diffraction intensity of 8 or more exists in the range where the diffraction angle 2θ is 19.0° or more to 22.0° or less, a diffraction peak representing a diffraction intensity of 15 or more exists in the range where the diffraction angle 2θ is 25.0° or more to 28° or less, a diffraction peak representing a diffraction intensity of 15 or more exists in the range where the diffraction angle 2θ is 34.5° or more to 37.5° or less, a diffraction peak representing a diffraction intensity of 10 or more exists in the range where the diffraction angle 2θ is 40.0° or more to 42.5° or less, and a diffraction peak representing a diffraction intensity of 10 or more exists in the range where the diffraction angle 2θ is 13.0° or more to 15.0° or less.

In FIG. 13, a diffraction peak (see arrow in the FIG. 13) derived from cristobalite, which cannot be seen in FIG. 12, can be seen near 2θ=21.7°. Accordingly, while the phosphor of Example 4 contains impurities, the crystal structure of Example 4 belongs to the same crystal structure as the host crystal or Example 1, and the light-emitting property of Example 4 is better than that of Examples 1 to 3.

An exemplary use of the phosphor of the invention will now be described by examples related to a light emitting device, but the phosphor according to exemplary embodiments of the present invention may be used in other types of devices as well. Thus, the following description of an exemplary use of the phosphor in a light emitting device does not restrict the use of the phosphor of the invention.

EXAMPLE 7 OF LIGHT EMITTING DEVICE USING THE PHOSPHOR OF THE INVENTION

Figure 14:
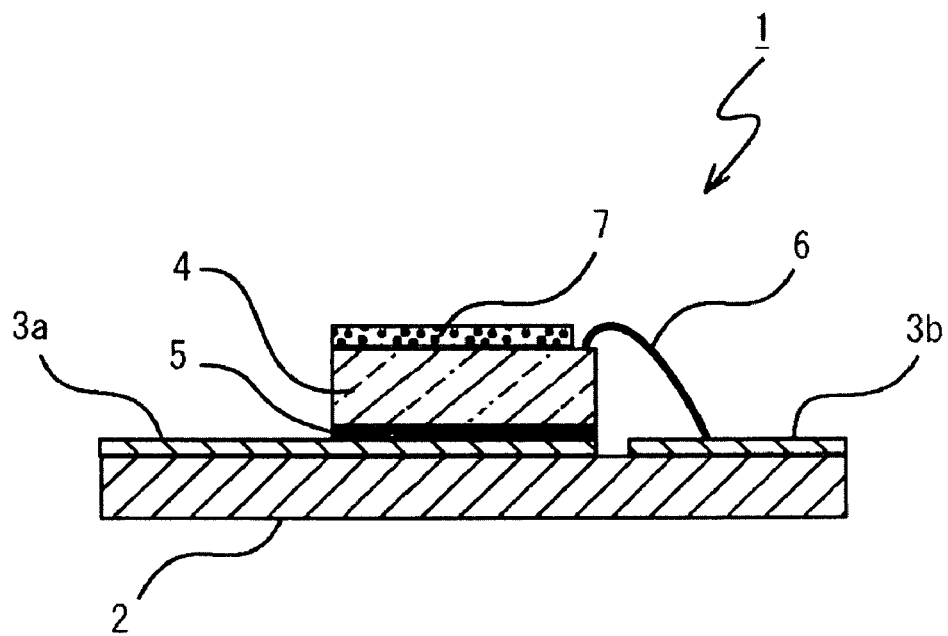
FIG. 14 is a schematic diagram illustrating an example of a light emitting device using the phosphor of the invention.

FIG. 14 is a schematic sectional view illustrating a light emitting device using the phosphor of the invention. In the light emitting device shown in FIG. 14, electrodes 3a and 3b are formed on a substrate 2. A semiconductor light emitting element 4 serving as an excitation light source is fixed on the electrode 3a by a mount member 5. The semiconductor light emitting element 4 and the electrode 3a are electrically coupled to each other through the mount member 5, and the semiconductor light emitting element 4 and the electrode 3b are electrically coupled to each other by a wire 6. A fluorescent layer 7 is formed on the semiconductor light emitting element 4.

The substrate 2 is advantageously made of materials having no conductivity but having high thermal conductivity. For example, a ceramic substrate (e.g., an aluminum nitride substrate, an alumina substrate, a mullite substrate, or a glass ceramic substrate), a glass epoxy substrate, or the like may be used. In the present example, the aluminum nitride substrate was used.

The electrodes 3a and 3b are conductive layers made of metal materials such as gold and copper. In the present example, the electrode 3a is a positive electrode and the electrode 3b is a negative electrode, which are formed on the substrate 2 using gold. Alternatively, the electrode 3a may be a negative electrode and the electrode 3b a positive electrode.

The semiconductor light emitting element 4 is an example of an excitation light source when the phosphor of the invention is used in a light emitting device. For example, an LED, an LD, or the like, which emits ultraviolet light or short-wavelength visible light, may be used. As an exemplary embodiment, an InGaN-based compound semiconductor may be used. In the InGaN-based compound semiconductor, a light emitting wavelength band thereof varies according to the content of In. When the content of In is large, the light emitting wavelength becomes a long wavelength. When the content of In is small, the light emitting wavelength becomes a short wavelength. The InGaN-based compound semiconductor containing an amount of In to produce a peak wavelength close to 400 nm has the best crystallinity and the highest quantum efficiency in emitting light.

In the present example, a 1 mm square LED (manufactured by SemiLED Inc.: MypLED™SL-V-U40AC) having a light emitting peak in 405 nm was used.

The mount member 5 is a conductive adhesive such as silver paste, by which the lower surface of the semiconductor light emitting element 4 is fixed to the electrode 3a, and a lower electrode of the semiconductor light emitting device 4 is electrically coupled to the electrode 3a formed on the substrate 2.

In the present example, a silver paste (produced by Ablestik Inc.: 84-1LMISR4) was dripped onto the electrode 3a using a dispenser, the lower surface of the semiconductor light emitting element 4 was bonded onto the silver paste, and then the silver paste was hardened under a circumference of 175° C. for 1 hour.

The wire 6 is a conductive member such as a gold wire. For example, the wire 6 is coupled to an upper electrode of the semiconductor light emitting element 4 and the electrode 3b by ultrasonic thermal compression, thereby electrically coupling both electrodes to each other.

In the present example, a gold wire with Φ45 μm is coupled to the upper electrode of the semiconductor light emitting element 4 and the electrode 3b formed on the substrate 2 by ultrasonic thermal compression.

In the fluorescent layer 7, one kind of phosphor or plural kinds of phosphors including at least the phosphor of the invention is sealed up in a film shape covering the upper surface of the semiconductor light emitting element 4 by a binder member. Such a fluorescent layer 7 is formed in the following manner: fluorescent paste is produced by mixing a phosphor into liquid or gel binder member; the fluorescent paste is applied onto the upper surface of the semiconductor light emitting element 4; and then the binder member of the applied fluorescent paste is hardened.

As the binder member, for example, silicone resin, fluorine resin, or the like may be used. Particularly, in the phosphor of the invention, since light in a wavelength band near 400 nm is advantageously used as excitation light, it is advantageous to use a binder member good in ultraviolet light resistance.

One kind or a plurality of kinds of phosphors having light emitting properties different from that of the phosphor of the invention may be mixed into the fluorescent layer 7. Accordingly, it is possible to obtain light with various colors by composing light having the other plurality of kinds of wavelength bands.

Substances having various properties other than phosphors may be mixed into the fluorescent layer 7. For example, a substance such as metal oxides, fluorine compounds, and sulfides having a higher refractive index than that of a binder member may be mixed into the fluorescent layer 7, thereby increasing the refractive index of the fluorescent layer 7. With such a configuration, total reflection occurring at the time when the light generated from the semiconductor light emitting element 4 enters the fluorescent layer 7 is reduced, and thus it is possible to improve an entering efficiency of excitation light into the fluorescent layer 7. When particle diameters of the mixed substances are made into nano size, it is possible to raise the refractive index without lowering transparency of the fluorescent layer 7.

In the present example, silicone resin (produce by Dow Corning Toray Silicone Co. Ltd.: JCR6140) was used as the binder member. The mixture of the following phosphor was mixed into the silicon resin so that the phosphor was 30 vol % to produce the fluorescent paste, the fluorescent paste was applied onto the upper surface of the semiconductor light emitting element 4 with a thickness of 100 μm, and the paste was fixed in a step hardening manner under a circumference of 80° C. for 40 minutes and then under a circumference of 150° C. for 60 minutes, thereby forming the fluorescent layer 7.

<Phosphor Used in Example 7>

A mixture of a phosphor was used in which a phosphor (yellow) of Example 1 of the invention and a phosphor $Sr_{10}(PO_4)_6Cl_2$:Eu (blue) were mixed at a composition ratio (weight ratio) of 1 (yellow):1.5 (blue).

<Phosphor Used in Comparative Example 2>

As Comparative Example 2, a mixture of a phosphor was used in which a phosphor $BaMgAl_{10}O_{17}$:Eu (blue), a phosphor $BaMgAl_{10}O_{17}$:Eu,Mn (green), and a phosphor $La_2O_2S$:Eu were mixed at a composition ratio (weight ratio) of 3 (blue):12 (green):85 (red).

In the light emitting device 1 configured as described above, when a driving current is applied to the electrodes 3a and 3b, the current flows in the semiconductor light emitting element 4 and thus the semiconductor light emitting element 4 emits light such as ultraviolet light and short-wavelength visible light with a characteristic wavelength band of the semiconductor light emitting element 4 to the fluorescent layer 7. The phosphor in the fluorescent layer 7 is excited by the light, and thus the phosphor emits light with a characteristic wavelength band thereof. Using such a configuration, it is possible to obtain a light emitting device that emits desired light by variously selecting the semiconductor light emitting elements 4 and/or the phosphors.

A current of 1 to 50 mA was applied to the light emitting devices of Example 7 and Comparative Example 2 in an integrating sphere to emit light, and light emitting powers were measured by a spectroscope (manufactured by Instrument System Inc.: CAS140B-152). Hereinafter, the result will be described in detail.

The light emitting device of Comparative Example 2 is a light emitting device having the same configuration as Example 5 except for raw materials of phosphors, and the measurement was performed under the same condition.

Table 4 shows light emitting powers (velocity of light) of the light emitting devices at the time when driving currents of 5, 10, and 50 mA were applied to the light emitting devices of Example 7 and Comparative Example 2. The light emitting powers are shown as relative values where the light emitting power (velocity of light) at the time when a driving current of 5 mA is applied to the light emitting device of Comparative Example 2 is 1.0.

As shown in Table 4, the light emitting device of Example 7 outputs a higher power than that of Comparative Example 2.

TABLE 4

|  | Light emitting power (velocity of light) Driving current | | |
| --- | --- | --- | --- |
|  | 5 mA | 10 mA | 50 mA |
| Example 7 | 4.7 | 10.8 | 61.3 |
| Comparative Example 2 | 1.0 | 2.1 | 9.0 |

The light emitting power is a relative value, where a light emitting power (velocity of light) at the time when a driving current of 5 mA is applied to the light emitting device of Comparative Example 2 is 1.0.

Figure 15:
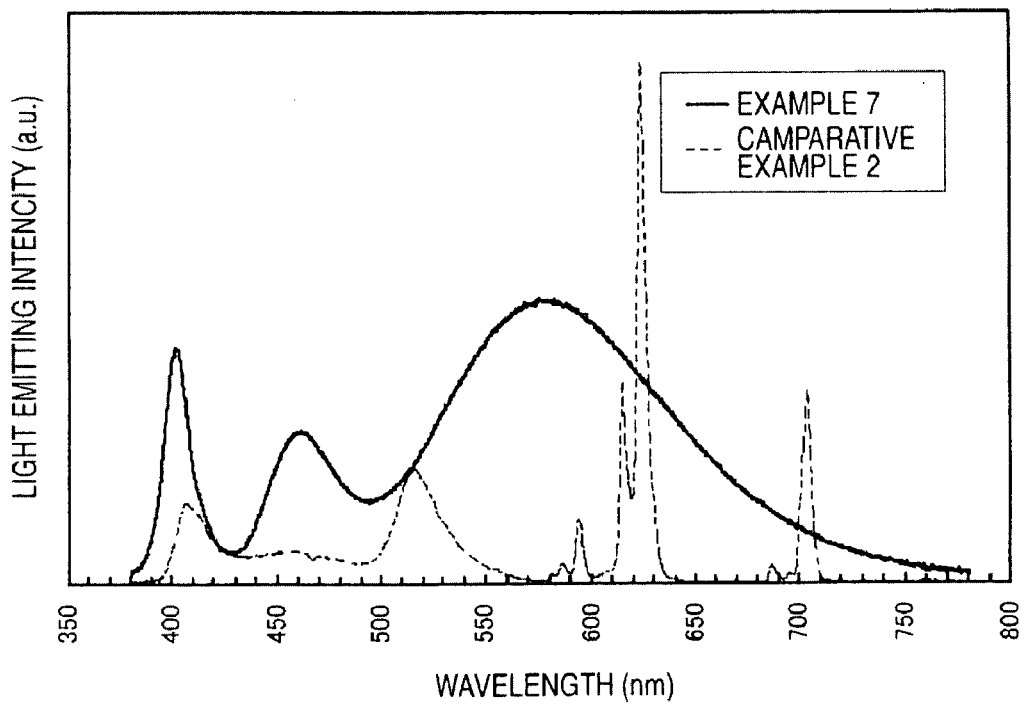
FIG. 15 is a diagram illustrating a light emitting spectrum (solid line) of a light emitting device according to Example 7 of the invention and a light emitting spectrum (dotted line) of a light emitting device according to Comparative Example 2.

FIG. 15 illustrates light emitting spectrum of the light emitting devices at the time when a driving current of 50 mA is applied to the light emitting devices of Example 7 and Comparative Example 2. A vertical axis of the graph shown in FIG. 15 denotes a light emitting intensity relative to Comparative Example. As shown in FIG. 15, the light emitting device of Example 7 denotes the broader light emitting spectrum than that of Comparative Example 2, and has a high color rendering property (Ra=76).

The phosphor of the invention has been described above in relation to examples thereof. However, the invention is not limited to these examples and the invention may be variously modified, improved, combined, and changed in type of use.

The phosphor of the invention can be used in various light emitting devices.

While the present invention has been shown and described with reference to certain exemplary embodiments thereof, it will be understood by those skilled in the art that various changes in form and details may be made therein without departing from the spirit and scope of the invention as defined by the appended claims. It is aimed, therefore, to cover in the appended claim all such changes and modifications as fall within the true spirit and scope of the present invention.

What is claimed is:

1. A phosphor comprising a composition represented by the formula:

$$M^1O_2 \cdot aM^2O \cdot bM^3X_2 : M^4$$

wherein $M^1$ is at least one element selected from the group consisting of Si, Ge, Ti, Zr, and Sn; $M^2$ is at least one element selected from the group consisting of Mg, Ca, Sr, Ba, and Zn; $M^3$ is at least one element selected from the group consisting of Mg, Ca, Sr, Ba, and Zn; X is at least one halogen element; $M^4$ is at least one element essentially including $Eu^{2+}$ selected from the group consisting of rare-earth elements and Mn; a is in the range of $0.1 \leq a \leq 1.3$; and b is in the range of $0.1 \leq b \leq 0.25$.

2. The phosphor according to claim 1, wherein when the content of $M^4$ in the formula is c mole ratio, c is in the range of $0.03 < c/(a+c) < 0.8$.

3. The phosphor according to claim 1, wherein $M^1$ in the formula essentially includes at least Si, and a ratio of Si is 80 mol % or more.

4. The phosphor according to claim 1, wherein $M^2$ in the formula essentially includes at least one of Ca and Sr, and a ratio of said at least one of Ca and Sr is 60 mol % or more.

5. The phosphor according to claim 1, wherein $M^3$ in the formula essentially includes at least Sr, and a ratio of Sr is 30 mol % or more.

6. The phosphor according to claim 1, wherein X in the formula essentially includes at least Cl, and a ratio of Cl is 50 mol % or more.

7. The phosphor according to claim 1, wherein in the formula, a is in the range of $0.30 \leq a \leq 1.2$, b is in the range of $0.1 \leq b \leq 0.20$, and the content c of $M^4$ is in the range of $0.05 \leq c/(a+c) \leq 0.5$.

8. A phosphor obtained by mixing and baking starting materials, wherein the starting materials include at least compounds represented by the formulas (1) to (4):

$$M^1O_2 \quad (1)$$

$$M^2O \quad (2)$$

$$M^3X_2 \quad (3)$$

$$M^4 \quad (4)$$

wherein mole ratios of the compounds are in the range of (1):(2)=1:0.1 to 1.0; (2):(3)=1:0.2 to 12.0; and (2):(4)=1:0.05 to 4.0, respectively, wherein $M^1$ is at least one element selected from the group consisting of Si, Ge, Ti, Zr, and Sn; $M^2$ is at least one element selected from the group consisting of Mg, Ca, Sr, Ba, and Zn; $M^3$ is at least one element selected from the group consisting of Mg, Ca, Sr, Ba, and Zn; X is at least one halogen element; and $M^4$ is at least one element essentially including $Eu^{2+}$ selected from the group consisting of rare-earth elements and Mn.

9. The phosphor according to claim 8, wherein $M^1$ in the formula (1) essentially includes at least Si, and a ratio of Si is 80 mol % or more.

10. The phosphor according to claim 8, wherein $M^2$ in the formula (2) essentially includes at least one of Ca and Sr, and a ratio of said at least one of Ca and Sr is 60 mol % or more.

11. The phosphor according to claim 8, wherein $M^3$ in the formula (3) essentially includes at least Sr, and a ratio of Sr is 30 mol % or more.

12. The phosphor according to claim 8, wherein X in the formula essentially includes at least Cl, and a ratio of Cl is 50 mol % or more.

13. The phosphor according to claim 8, wherein mole ratios of the compounds are in the range of (1):(2)=1:0.25 to 1.0; (2):(3)=1:0.3 to 6.0; and (2):(4)=1:0.05 to 3.0, respectively.

14. The phosphor according to claim 8, wherein mole ratios of the compounds are in the range of (1):(2)=1:0.25 to 1.0; (2):(3)=1:0.3 to 4.0; and (2):(4)=1:0.05 to 3.0, respectively.

15. The phosphor according to claim 8, wherein a peak of an excitation spectrum of the phosphor is in a wavelength band of 350 to 430 nm.

16. The phosphor according to claim 8, wherein a peak of a light emitting spectrum of the phosphor is in a wavelength band of 560 to 590 nm, and a half-value width is 100 nm or more.

17. The phosphor according to claim 1 or 8, wherein at least a part of crystals included in the phosphor have a pyroxene crystal structure.

18. The phosphor according to claim 1 or 8, wherein at least a part of crystals included in the phosphor belong to a crystal system being monoclinic, a Bravais lattice being a base-centered monoclinic lattice, and a space group being C2/m.

19. The phosphor according to claims 1 or 8, wherein according to an X-ray diffraction pattern using a Kα characteristic X-ray of Cu in at least a part of crystals included in the phosphor, when a diffraction intensity of a highest-intensity diffraction peak is set to 100 in which a diffraction angle 2θ exists in the range from 29.0° to 30.5°, peaks having at least a diffraction intensity of 8 or more exist in the range of $28.0°\leq 2\theta \leq 29.5°$; in the range of $19.0°\leq 2\theta \leq 22.0°$; in the range of $25.0°\leq 2\theta \leq 28.0°$; in the range of $34.5°\leq 2\theta \leq 37.5°$; and in the range of $40.0°\leq 2\theta \leq 42.5°$.

20. The phosphor according to claims 1 or 8, wherein according to an X-ray diffraction pattern using a Kα characteristic X-ray of Cu in at least a part of crystals included in the phosphor, when a diffraction intensity of a highest-intensity diffraction peak is set to 100 in which a diffraction angle 2θ exists in the range from 29.0° to 30.5°, a diffraction peak having a diffraction intensity of 50 or more exists in the range of $28.0°\leq 2\theta \leq 29.5°$;

a diffraction peak having a diffraction intensity of 8 or more exists in the range of $19.0°\leq 2\theta \leq 22.0°$;

a diffraction peak having a diffraction intensity of 15 or more exists in the range of $25.0°\leq 2\theta \leq 28.0°$;

a diffraction peak having a diffraction intensity of 15 or more exists in the range of $34.5°\leq 2\theta \leq 37.5°$;

a diffraction peak having a diffraction intensity of 10 or more exists in the range of $40.0°\leq 2\theta \leq 42.5°$; and a diffraction peak having a diffraction intensity of 10 or more exists in the range of $13.0°\leq 2\theta \leq 15.0°$.

21. The phosphor according to claims 1 or 8, wherein according to a diffraction pattern using a Kα characteristic X-ray of Mo in at least a part of crystals included in the phosphor, when a diffraction intensity of a highest-intensity diffraction peak is set to 100 in which a diffraction angle 2θ exists in the range from 12.5° to 15.0°, a diffraction peak having a diffraction intensity of 50 or more exists in the range of $12.0°\leq 2\theta \leq 14.5°$;

a diffraction peak having a diffraction intensity of 8 or more exists in the range of $8.0°\leq 2\theta \leq 10.5°$;

a diffraction peak having a diffraction intensity of 15 or more exists in the range of $11.0°\leq 2\theta \leq 13.0°$;

a diffraction peak having a diffraction intensity of 15 or more exists in the range of $15.5°\leq 2\theta \leq 17.0°$;

a diffraction peak having a diffraction intensity of 10 or more exists in the range of $17.5°\leq 2\theta \leq 19.5°$; and a diffraction peak having a diffraction intensity of 10 or more exists in the range of $5.0°\leq 2\theta \leq 8.0°$.

22. A phosphor comprising a mixture of the crystals according to claims 17 and crystal phase other than said crystals or amorphous phase, wherein a ratio of the crystals is 20 weight % or more in the mixture.

* * * * *